US00RE35255E

United States Patent [19]

Turchan

[11] E Patent Number: Re. 35,255

[45] Reissued Date of Patent: May 28, 1996

[54] COMBINED HOLE MAKING AND THREADING TOOL

[76] Inventor: Manuel C. Turchan, 12825 Ford Rd., Dearborn, Mich. 48126

[21] Appl. No.: 146,727

[22] Filed: Jan. 21, 1988

Related U.S. Patent Documents

Reissue of:

[64] Patent No.: 4,651,374
Issued: Mar. 24, 1987
Appl. No.: 840,443
Filed: Mar. 17, 1986

[51] Int. Cl.[6] ..... B23G 5/20

[52] U.S. Cl. ..... 409/74; 470/198; 470/199; 408/222

[58] Field of Search ..... 409/65, 66, 73, 409/71, 74, 75, 76; 10/140, 141 R, 152 R, 152 T, 75, 82; 408/218, 219, 220, 221, 222, 59, 22, 30, 224; 72/70, 71, 112, 114, 118, 120, 126; 407/58, 59, 61, 63, 20, 24, 29

[56] References Cited

U.S. PATENT DOCUMENTS

| | | | |
|---|---|---|---|
| 83,371 | 10/1868 | Foster . | |
| 279,360 | 6/1883 | Douglas | 408/223 |
| 931,526 | 8/1909 | Turner et al. . | |
| 1,034,724 | 8/1912 | Mueller | 408/226 |
| 1,316,718 | 9/1919 | Hall | 409/74 |
| 1,361,098 | 12/1920 | Richards | 409/73 |
| 1,365,954 | 1/1921 | Richards . | |
| 1,408,793 | 3/1922 | Anderson et al. | 408/224 |
| 1,539,628 | 5/1925 | Bayer | 408/219 |
| 1,836,954 | 12/1931 | Bryant | 10/75 |
| 2,046,041 | 6/1936 | Spitz . | |
| 2,191,177 | 2/1940 | Stone . | |
| 2,266,338 | 8/1941 | Sheaffer | 10/154 |
| 2,286,477 | 6/1942 | Falls | 409/74 X |
| 2,312,354 | 3/1943 | Norberg | 409/74 |
| 2,451,497 | 10/1948 | Kratchman | 409/74 |
| 2,526,762 | 10/1950 | Miller | 409/73 X |
| 2,553,669 | 5/1951 | Norberg et al. | 409/74 |
| 2,684,492 | 7/1954 | Miner et al. | 408/219 |
| 2,703,490 | 3/1955 | Barth . | |
| 2,735,116 | 2/1956 | Mueller | 10/140 |
| 2,813,280 | 11/1957 | Huffman . | |
| 2,898,612 | 8/1959 | Hofbauer . | |
| 3,085,453 | 4/1963 | Mossberg | 408/59 X |

(List continued on next page.)

FOREIGN PATENT DOCUMENTS

| | | |
|---|---|---|
| 1068255 | 6/1954 | France . |
| 226556 | 10/1910 | Germany . |
| 2427616 | 12/1975 | Germany . |
| 50-123998 | 10/1975 | Japan . |
| 50-140990 | 11/1975 | Japan . |
| 51-11292 | 1/1976 | Japan . |
| 51-35174 | 3/1976 | Japan . |
| 51-27309 | 8/1976 | Japan . |
| 51-43228 | 11/1976 | Japan . |
| 52-126397 | 9/1977 | Japan . |
| 53-57397 | 5/1978 | Japan . |
| 53-34039 | 9/1978 | Japan . |
| 53-27519 | 9/1978 | Japan . |
| 54-24726 | 2/1979 | Japan . |
| 54-150795 | 11/1979 | Japan . |
| 54-150794 | 11/1979 | Japan . |
| 55-24862 | 9/1980 | Japan . |
| 55-129732 | 9/1980 | Japan . |
| 55-160733 | 11/1980 | Japan . |
| 57-4450 | 1/1982 | Japan . |
| 57-11698 | 3/1982 | Japan . |
| 57-81030 | 5/1982 | Japan . |
| 57-96723 | 6/1982 | Japan . |

(List continued on next page.)

*Primary Examiner*—William Briggs
*Attorney, Agent, or Firm*—Remy J. VanOphem; John VanOphem

[57] ABSTRACT

A combination tool is disclosed for drilling a hole in a workpiece on the inward feed of the tool and for threading the hole during retraction of the tool. The tool comprises a straight body with a drill point at the forward end, a shank at the rearward end and a threadform mill between the drill point and the shank.

58 Claims, 1 Drawing Sheet

U.S. PATENT DOCUMENTS

| | | | |
|---|---|---|---|
| 3,147,646 | 9/1964 | Rawcliffe, Jr. . | |
| 3,258,797 | 5/1966 | Budd | 408/25 X |
| 3,621,754 | 11/1971 | Ditson | 409/74 |
| 4,271,554 | 6/1981 | Grenell | 10/152.7 |
| 4,375,708 | 3/1983 | Hellnick et al. | 10/87 |
| 4,409,868 | 10/1983 | Huddle et al. . | |
| 4,466,762 | 8/1984 | Menke . | |

FOREIGN PATENT DOCUMENTS

| | | |
|---|---|---|
| 57-157411 | 10/1982 | Japan . |
| 58-35822 | 8/1983 | Japan . |
| 58-53974 | 12/1983 | Japan . |
| 59-196120 | 11/1984 | Japan . |
| 60-39429 | 3/1985 | Japan . |
| 60-194425 | 12/1985 | Japan . |
| 368937 | 5/1971 | U.S.S.R. . |

Fig-1
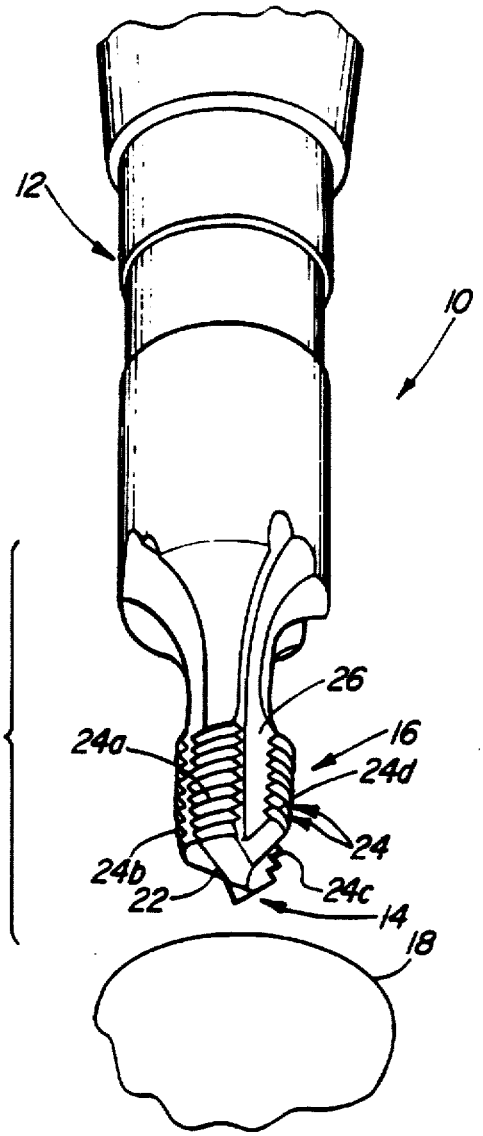
Fig-2
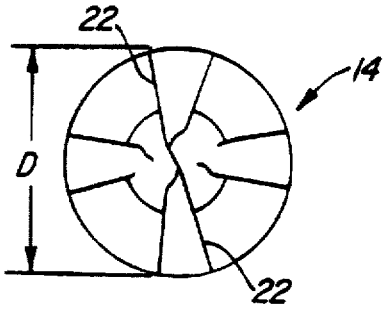
Fig-3
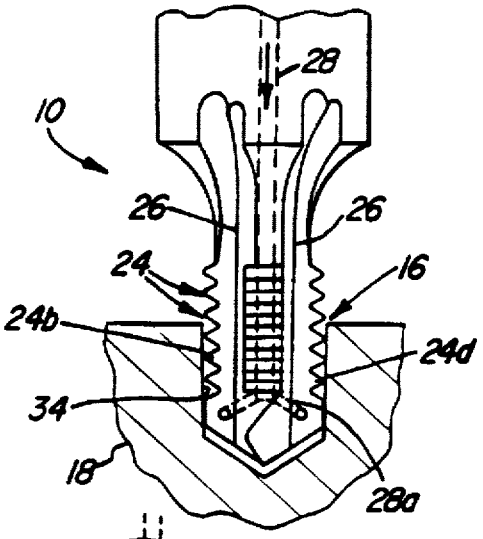
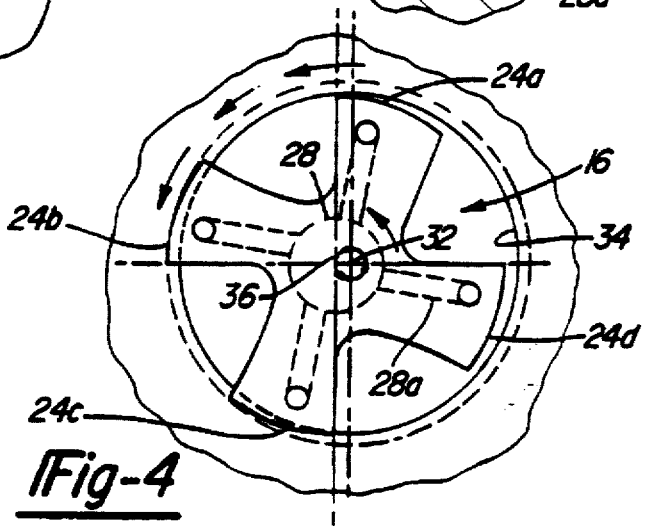
Fig-4

COMBINED HOLE MAKING AND THREADING TOOL

Matter enclosed in heavy brackets [ ] appears in the original patent but forms no part of this reissue specification; matter printed in italics indicates the additions made by reissue.

FIELD OF THE INVENTION

This invention relates to tools; more particularly, it relates to a tool for making a threaded hole in metal and other materials.

BACKGROUND OF THE INVENTION

In machining of metals and other materials, there are many applications where it is desirable to make a hole and thread it with a single tool. The single tool for hole making and threading is needed not only for through holes but also for blind holes in a workpiece. The advantage of such a tool is that it reduces the number of motions or operations required to produce a threaded hole; it is especially advantageous in conjunction with high speed machining operations.

In the prior art, it is known to use a single tool for drilling a hole and forming internal threads by swaging or coining the metal. A tool of this kind is disclosed in the Barth U.S. Pat. No. 2,703,419 granted Mar. 8, 1955, which describes a swaging tap having a drill or end mill on the leading end thereof to cut the hole which is to be threaded. This tool is rotated and the hole is cut and threaded on the inward feed of the tool and the tool is unscrewed from the threaded hole. A similar tool is disclosed in the Grenell U.S. Pat. No. 4,271,554 granted Jun. 9, 1981. In tools of this kind, the maximum diameter of the swaging tap must be larger than the maximum diameter of the drill or end mill. Further, as described in the Grenell patent, the minor diameter of the female threads is smaller than the diameter of the drilled hole and the major diameter of the threads is larger than the diameter of the drilled hole.

A general object of this invention is to provide a combined hole making and threading tool which may be used for both through holes and blind holes and which lends itself to high speed machining.

SUMMARY OF THE INVENTION

In accordance with this invention, a tool is provided for making a hole in a workpiece on the inward feed of the tool and for threading the hole during retraction of the tool or alternatively during further inward feed of the tool. This is accomplished by a tool [comprising] *having* an elongated straight body with a shank at one end, a hole making means at the other end and a thread making means intermediate the ends. The hole making means, such as a drill point, is operative by rotation about the tool axis and the thread making means, such as a threadform mill, is operative by helical motion of the tool combined with rotation about the tool axis. The thread making means has a maximum diameter equal to the maximum diameter of the hole making means whereby the thread making means can enter the hole without interference. Further, the invention [comprises] *includes* a tool having a thread making means for making female threads with a crest or minor diameter no smaller than the diameter of the hole formed by the hole making means. [Further, the] *The* invention [comprises] *further includes* a thread-form [mill. Further,] *mill end* the body of the tool includes a chip removal passage.

A complete understanding of this invention may be obtained from the detailed description that follows taken with the accompanying drawings.

*BRIEF* DESCRIPTION OF THE DRAWINGS

FIG. 1 is a perspective view of the tool of this invention;

FIG. 2 is an end view of the forward end of the tool;

FIG. 3 depicts the tool during drilling a hole in a workpiece; and

FIG. 4 depicts the tool during milling of threads in the workpiece.

Referring now to the drawings, there is shown an

[BEST MODE FOR CARRYING OUT THE INVENTION] *DETAILED DESCRIPTION OF THE PREFERRED EMBODIMENT*

Referring now to the drawings, there is shown an illustrative embodiment of the invention in a combination tool [comprising] *including* a drill point and a thread-form mill for hole making and thread making. It will be appreciated as the description proceeds that the inventive tool may be embodied in different forms for use in a wide variety of applications.

The tool 10 of this invention is shown in a perspective view in FIG. 1. It [comprises] *has*, in general, an elongated rectilinear body including a shank 12 at one end which is provided with a suitable fitting, of conventional design, for engagement by a tool holder of a machine tool. The tool 10 also [comprises] *includes* the hole making means in the form of a drill point 14 at the forward end and a thread making means, in the form of a thread-form mill 16 intermediate the drill point 14 and the shank 12. The tool 10 is made of a material selected in accordance with the selected workpiece application and is suitably formed as a unitary body.

The drill point 14 at the forward end of the tool is of known design having a pair of cutting edges 22, as shown in FIGS. 1 and 2. The drill point 14 has a maximum diameter D and is adapted for [right hand] *right-hand* or clockwise rotation about the tool axis for hole drilling in a conventional manner.

The thread-form mill 16 is provided with a multiplicity of thread-form cutters 24 in a conventional manner. The tool has one or more flutes 26 extending from the drill point throughout the thread-form mill for the purpose of chip removal. Also, the tool is provided with a coolant passage 28 with branch passages 28a for supply of liquid under pressure to the drill point and to aid in chip removal.

In the thread-form mill 16, each of the cutters 24 is of annular configuration and the number of cutters 24 is preferably equal to or greater than the number of threads to be cut. Each cutter 24 [comprises] *has* a number of cutter segments 24a, 24b, 24c and 24d which are circumferentially aligned and are separated by the intervening flutes. Each cutter segment has a cutting edge disposed on the leading end thereof in accordance with the direction of cutting rotation. The thread-form mill 16 is adapted for [right hand] *right-hand* or clockwise rotation for cutting threads. The cutter segments of the thread-form mill have a maximum crest diameter which is equal to the maximum diameter of the drill point 14.

The tool 10 may be used in any CNC (computerized numerically controlled) machining center. *Kearney & Trecker Corp., Data-Mill 700 CNC Milling Machine as*

*disclosed in the article entitled High Speed Machining Could Burst On Scene, published in Iron Age, Apr. 27, 1981; Ex–Cell–O Inc., model 108B Workcenter-type machining center as disclosed in the above referenced article of Iron Age Magazine; Turchan Hydro-mills equipped with Bunker-Ramo BRC-3100 three axis-numerical control system as disclosed in an article entitled 6 at North American Rockwell Corporation, published in American Machinist, Feb. 10, 1969; and Extremon Horizontal Spindle Machining Centers with DC pulse width–modulated servo drives from CSR under the command of a Vega III CNC system that provided simultaneous three-axis interpolation, as disclosed in American Machinist Magazine in an article entitled Designing for High-Speed Machining, in May 1981.* Also, it may be used in a special machine tool adapted for using the tool of this invention. The hole making and thread making operations are as follows. For hole making, as shown in FIG. 3, the tool is rotated at the desired speed about its own longitudinal axis and the drill point 14 is advanced into the workpiece at the desired feed rate. When the desired hole depth is achieved, the feed is stopped but the tool rotation is continued. [The] *An* axis 32 of the drilled hole 34 is indicated in FIG. 4. The tool is backed off sufficiently to provide the desired clearance for the drill point. Then, with the rotation continuing in the same direction, the thread milling portion of the cycle is commenced by imparting helical motion to the tool in the retracting direction. The longitudinal axis of the tool describes an orbital path 36 around the axis 32 of the drilled hole as shown in FIG. 4. While the tool 10 is rotated about its own longitudinal axis and moved in the orbital path 36, it is retracted axially to generate the helical motion to cut the desired threads. The tool executes one orbital revolution during axial retraction corresponding to one thread pitch. Preferably, more than one orbital revolution is imparted to the tool, for example about one and one-half revolutions, to ensure clean-cut threads. After the orbital motion is complete the tool is moved to align the axis thereof with the hole axis and then it is withdrawn. The same tool may be used for cutting [left hand] *left-hand* threads by imparting counterclockwise orbital motion to it.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. [For] *A hole making and threading tool for* use in a machine tool which is adapted to [simultaneously] rotate a cutting tool about its axis and feed the cutting tool axially for cutting a hole in *an imperforate surface of a solid portion of* a workpiece and [adapted to simultaneously rotate said cutting tool about its axis,] *thereafter concurrently* move [the] *said* axis in an orbital path and [move the cutting tool] axially whereby a point on the cutting tool defines a helical path, [a] *said* hole making and threading tool comprising:

an elongated straight body having a shank at one end[,]; a hole making means at the other end *for making said hole in said imperforate surface of said solid portion of said workpiece, said hole having a wall;* and a thread making means intermediate said [ends,] *one end and said other end; and*

[and] at least one chip removal passage extending from said hole making means through said thread making means [,];

said thread making means having a [uniform] maximum diameter [equal to] *which is no greater than* the maximum diameter of said hole making means whereby said thread making means can enter [the] *said* hole made by [the] *said* hole making means *in said imperforate surface of said solid portion of said workpiece* without interference *with said wall of said hole to thereafter form a thread in said wall.*

2. The invention as defined in claim 1 wherein said hole making means is a drill *form.*

3. The invention as defined in claim 1 wherein said thread making means is a thread-form mill.

4. The invention as defined in claim 1 wherein said hole making means is a drill *form* and said thread making means is a thread-form mill.

5. The invention as defined in claim 1 wherein said hole making means comprises a drill point[,] and said thread making means comprises a thread-form mill having a plurality of thread-form cutters.

6. The invention as defined in claim 1 wherein said thread making means is a thread-form [mill] for making female threads having a minimum diameter no smaller than the diameter of said hole.

7. [For] *A hole making and threading tool for* use in a machine tool which is adapted to *simultaneously* rotate a cutting tool about its axis and feed [the] *said* cutting tool axially for cutting a hole in *an imperforate surface of a solid portion of* a workpiece and [adapted to simultaneously rotate said cutting tool about its axis,] *thereafter concurrently* move [the] *said* axis in an orbital path and [move the cutting tool] axially whereby a point on said cutting tool defines a helical path, [a] *said* hole [cutting] *making* and threading tool comprising:

an elongated body having a shank at one end adapted to be held by said machine tool[,];

a hole cutter at the other end[,] *for making said hole in said imperforate surface of said solid portion of said workpiece, said hole having a wall;*

[and] an axially extending thread-form mill intermediate said shank and said hole cutter[,];

[and] at least one chip removal passage extending from said hole cutter through said thread-form mill[,]; *and* said thread-form mill having a [uniform] maximum diameter [equal to] *no greater than* the maximum diameter of said hole cutter whereby said thread-form mill can enter [a] *said* hole made by said hole cutter *in said imperforate surface of said solid portion of said workpiece* without interference *with said wall of said hole to thereafter form a thread in said wall.*

*8. The invention as defined in claim 1 wherein said thread making means has a uniform maximum diameter equal to said maximum diameter of said hole making means.*

*9. The invention as defined in claim 1 further comprising at least one chip removal passage extending from said hole making means through said thread making means.*

*10. The invention as defined in claim 1 wherein said maximum diameter of said thread making means is a uniform diameter.*

*11. The invention as defined in claim 7 wherein said hole cutter comprises a drill point form.*

*12. A method for producing a threaded hole in an imperforate surface of a solid portion of a workpiece, said method comprising the steps of:*

*providing an elongated tool having an axis of rotation, a hole making means at one end, and a thread making means on the side thereof;*

*rotating said tool about said axis of rotation while shifting it axially to move said hole making means against and*

*into said imperforate surface of said solid portion of said workpiece to form a hole therein, said hole having a wall;*

*while rotating said tool, concurrently moving said axis of rotation orbitally around said hole and axially along said axis of rotation to produce threads in said wall of said hole;*

*displacing said axis of rotation back to the center of said hole; and*

*retracting said tool from said hole.*

*13. The method as defined in claim 12 wherein during orbital movement of said axis of rotation of said tool it is shifted axially one thread pitch to mill helical threads in said wall of said hole.*

*14. The method as defined in claim 12 wherein said tool is displaced radially to displace said axis of rotation.*

*15. The method as defined in claim 13 wherein said tool is displaced radially to displace said axis of rotation.*

*16. The method as defined in claim 12 wherein said axis of rotation of said tool is moved orbitally through three hundred sixty degrees around said hole.*

*17. The method as defined in claim 13 wherein said axis of rotation of said tool is moved orbitally through three hundred sixty degrees around said hole.*

*18. The method as defined in claim 12 wherein said tool is displaced radially to displace sad axis of rotation, and said axis of rotation is moved orbitally through three hundred sixty degrees around said hole.*

*19. The method as defined in claim 13 wherein said tool is displaced radially to displace said axis of rotation, and said axis of rotation is moved orbitally through three hundred sixty degrees around said hole.*

*20. The method as defined in claim 12 further comprising the step of introducing a fluid under pressure into said hole adjacent the bottom thereof and causing said fluid to flow along said tool toward the mouth of said hole.*

*21. The method as defined in claim 20 wherein said fluid under pressure is introduced into said hole through said tool.*

*22. The method as defined in claim 12 wherein prior to said step of concurrently moving said axis of rotation orbitally and axially said tool is moved axially out of said hole to provide a clearance for said hole making means.*

*23. A method of producing a threaded hole in an imperforate surface of a solid portion of a workpiece, said method comprising the steps of:*

*providing an elongated tool having an axis of rotation, a drill means at one end and a thread milling profile along the side thereof;*

*rotating said tool about said axis of rotation while shifting it axially to move said drill means against and into said imperforate surface of said solid portion of said workpiece to form a hole therein, said hole having a wall;*

*while continuing to rotate said tool, concurrently moving said axis of rotation orbitally around said hole at least three hundred sixty degrees and shifting it axially along said axis of rotation one thread pitch to form threads in said wall of said hole;*

*displacing said tool back to the center of said hole; and*

*retracting said tool from said hole.*

*24. The method as defined in claim 23 wherein during said orbital movement step said tool is axially shifted in a direction out of said hole one thread pitch.*

*25. The method as defined in claim 23 wherein said tool is symmetrical with respect to a longitudinal axis which is substantially coincident with said axis of rotation.*

*26. The method as defined in claim 23 wherein prior to said step of concurrently moving said axis orbitally and axially said tool is moved axially out of said hole to provide a clearance for said drill means.*

*27. A hole making and threading tool comprising:*

*a shank having one end portion, an opposite end portion and an intermediate portion therebetween, said one end portion being adapted to be engaged for rotation and manipulation, said opposite end portion having hole making means for making a hole having a wall as said tool is rotated and manipulated longitudinally into an imperforate surface of a solid portion of a workpiece, said hole making means having an axis of rotation and a maximum diameter;*

*at least one longitudinally extending flute on said shank; and*

*thread cutting means located on said intermediate portion of said shank for cutting a thread in said wall of said hole in said imperforate surface of said solid portion of said workpiece, said thread cutting means having a maximum diameter no greater than said maximum diameter of said hole making means whereby said thread cutting means can enter said hole made by said hole making means in said imperforate surface of said solid portion of said workpiece without interference with said wall of said hole to thereafter form a thread in said wall.*

*28. The invention as defined in claim 27 wherein there are a plurality of flutes and said tool is symmetrical about a longitudinal axis and the longitudinal center of mass substantially coincides with such longitudinal axis.*

*29. The invention as defined in claim 27, further comprising means defining a fluid passageway extending axially within said tool for communication at said one end portion with a source of fluid under pressure and opening outwardly of said tool at a point to deliver said source of fluid under pressure to said imperforate surface of said solid portion of said workpiece.*

*30. The invention as defined in claim 29 wherein said hole making means comprises a drill point and said means defining a fluid passageway opens outwardly of said tool adjacent said drill point for delivering fluid under pressure into said hole in said workpiece.*

*31. A hole making and threading tool comprising:*

*an elongated straight body having a shank at one end; a hole making means having an axis of rotation at an opposite end for making a hole in an imperforate surface of a solid portion of a workpiece, said hole having a wall; and a thread making means intermediate said one end and said opposite end of said elongated straight body; said thread making means having a maximum diameter no greater than the maximum diameter of said hole making means whereby said thread making means enters said hole without interference with said wall of said hole to thereafter form threads in said wall of said hole in said imperforate surface of said solid portion of said workpiece.*

*32. A hole making and threading tool for use in a machine tool which is adapted to rotate a cutting tool about its axis and feed said cutting tool axially for cutting a hole having a wall in an imperforate surface of a solid portion of a workpiece and adapted to simultaneously rotate said cutting tool about said axis, move said axis in an orbital path and move said cutting tool axially whereby a point on said cutting tool defines a helical path, said hole making and threading tool comprising:*

*an elongated straight body having a shank at one end, a hole making means for making a hole in said imper-*

*forate surface of said solid portion of said workpiece at the other end and a thread making means intermediate said one end and said other end; and*

*said thread making means having a maximum diameter which is no greater than said maximum diameter of said hole making means whereby said thread making means can enter said hole made by said hole making means without interference with said wall of said hole to thereafter form threads in said wall of said hole in said workpiece.*

*33. The invention as defined in claim 32 wherein said hole making means is a drill form.*

*34. The invention as defined in claim 32 wherein said thread making means is a thread-form mill.*

*35. The invention as defined in claim 32 wherein said hole making means is a drill form and said thread making means is a thread-form mill.*

*36. The invention as defined in claim 32 wherein said hole making means comprises a drill point, and said thread making means comprises a thread-form mill having a plurality of thread cutters.*

*37. The invention as defined in claim 32 wherein said thread making means is a thread-form mill for making female threads having a minimum diameter no smaller than the diameter of said hole.*

*38. The invention as defined in claim 32 wherein said maximum diameter of said thread making means is a uniform diameter.*

*39. In combination with a machine tool of the type having a spindle adapted to simultaneously rotate a cutting tool about its axis and feed said cutting tool axially for cutting a hole in an imperforate surface of a solid portion of a workpiece and thereafter concurrently move said axis in an orbital path and axially whereby a point on said cutting tool defines a helical path, the improvement comprising a hole making and threading tool having:*

*an elongated straight body having a shank at one end; a hole making means at the other end for making said hole in said imperforate surface of said solid portion of said workpiece, said hole having a wall; and a thread making means intermediate said one end and said other end;*

*at least one chip removal passage extending from said hole making means through said thread making means; and*

*said thread making means having a maximum diameter which is no greater than the maximum diameter of said hole making means whereby said thread making means can enter said hole made by said hole making means in said imperforate surface of said solid portion of said workpiece without interference with said wall of said hole to thereafter form a thread in said wall.*

*40. The combination as defined in claim 39 further comprising means for moving said hole making means along said axis such that said hole making means forms said hole in said imperforate surface of said solid portion of said workpiece while said thread making means enters said hole without interference with said wall in said hole; and means for moving said tool axially along said axis of said tool concurrently with moving said axis in an orbital path such that as said tool moves axially and orbitally helical threads are formed in said wall of said hole in said workpiece.*

*41. The combination as defined in claim 39 wherein said hole making means is a drill form.*

*42. The combination as defined in claim 41 further comprising means for moving said drill form along said axis such that said drill form forms said hole in said imperforate surface of said solid portion of said workpiece while said thread making means enters said hole without interference with said wall in said hole; and means for moving said tool axially along said axis of said tool concurrently with moving said axis in an orbital path such that as said tool moves axially and orbitally helical threads are formed in said wall of said hole in said workpiece.*

*43. The combination as defined in claim 39 wherein said thread making means is a thread-form mill.*

*44. The combination as defined in claim 43 further comprising means for moving said tool axially along said axis of said tool concurrently with moving said axis in an orbital path such that as said tool moves axially and orbitally, said thread-form mill forms helical threads in said hole; and means for moving said hole making means along said axis such that said hole making means forms a hole in said imperforate surface of said solid portion of said workpiece while said thread making means enters said hole without interference with said wall of said hole.*

*45. The combination as defined in claim 39 wherein said hole making means is a drill form and said thread making means is a thread-form mill.*

*46. The combination as defined in claim 45 further comprising means for moving said drill form along said axis such that said drill form forms a hole in said imperforate surface of said solid portion of said workpiece while said thread making enters said hole without interference with said wall of said hole; and means for moving said tool axially along said axis of said tool concurrently with moving said axis in an orbital path such that as said tool moves axially and orbitally, said thread-form mill forms helical threads in said wall of said hole in said workpiece.*

*47. The combination as defined in claim 39 wherein said hole making means is a hole cutter and wherein said thread making means is an axially extending thread-form mill.*

*48. The combination as defined in claim 47 further comprising means for moving said tool along said axis such that said hole cutter forms a hole in said imperforate surface of said solid portion of said workpiece while said thread making means enters said hole without interference with said wall of said hole; and means for moving said tool axially along said axis of said tool concurrently with moving said axis in an orbital path such that as said tool moves axially and orbitally, said thread-form mill forms helical threads in said wall of said hole in said workpiece.*

*49. The combination as defined in claim 47 wherein said hole cutter comprises a drill point form.*

*50. The combination as defined in claim 49 further comprising means for moving said tool along said axis such that said drill point form forms a hole in said imperforate surface of said solid portion of said workpiece while said thread-form mill enters said hole without interference with said wall of said hole; and means for moving said tool axially along said axis of said tool concurrently with moving said axis in an orbital path such that as said tool moves axially and orbitally, said thread-form mill forms helical threads in said wall of said hole in said workpiece.*

*51. In combination with a machine tool of the type having a spindle adapted to be engaged for rotation and manipulation of a cutting tool, the improvement comprising a hole making said threading tool having:*

*a shank having one end portion, an opposite end portion and an intermediate portion therebetween, said one end portion being adapted to be engaged for rotation and manipulation, said opposite end portion having hole making means for making a hole having a wall as said tool is rotated and manipulated longitudinally into an*

*imperforate surface of a solid portion of a workpiece, said hole making means having an axis of rotation and a maximum diameter;*

*at least one longitudinally extending flute on said shank; and*

*thread cutting means located on said intermediate portion of said shank for cutting a thread in said wall of said hole in said imperforate surface of said solid portion of said workpiece, said thread cutting means having a maximum diameter no greater than said maximum diameter of said hole making means whereby said thread cutting means can enter said hole made by said hole making means in said imperforate surface of said solid portion of said workpiece without interference with said wall of said hole to thereafter form a thread in said wall.*

*52. The combination as defined in claim 51 further comprising:*

*means for rotating said tool;*

*means for moving said hole making means along said axis of rotation such that said hole making means forms a hole in said imperforate surface of said solid portion of said workpiece while said thread cutting means enters said hole without interference with said wall of said hole; and*

*means for concurrently moving said tool axially along said axis of rotation and orbitally around said axis of rotation such that as said tool moves axially and orbitally helical threads are formed in said wall of said hole in said workpiece.*

*53. The combination as defined in claim 51 further comprising a plurality of flutes and wherein said tool is symmetrical about a longitudinal axis and the longitudinal center of mass substantially coincides with such longitudinal axis.*

*54. The combination as defined in claim 53 further comprising means for moving said hole making means along said axis of rotation such that said hole making means forms a hole in said imperforate surface of said solid portion of said workpiece while said thread cutting means enters said hole without interference with said wall of said hole;*

*means for rotating said tool; and*

*means for concurrently moving said tool axially along said axis of rotation and orbitally around said axis of rotation such that as said tool moves axially and orbitally helical threads are formed in said wall of said hole in said workpiece.*

*55. The combination as defined in claim 51 further comprising means defining a fluid passageway extending axially within said tool for communication at said one end portion with a source of fluid under pressure and opening outwardly of said tool at a point to deliver said source of fluid under pressure to said imperforate surface of said solid portion of said workpiece.*

*56. The combination as defined in claim 55 further comprising means for moving said hole making means along said axis of rotation said that said hole making means forms a hole in said imperforate surface of said solid portion of said workpiece while said thread cutting means enters said hole without interference with said wall of said hole;*

*means for rotating said tool; and*

*means for concurrently moving said tool axially along said axis of rotation and orbitally around said axis of rotation such that as said tool moves axially and orbitally helical threads are formed in said wall of said hole in said workpiece.*

*57. The combination as defined in claim 55 wherein said hole making means comprises a drill point and said means defining a fluid passageway opens outwardly of said tool adjacent said drill point for delivering fluid under pressure into said hole in said workpiece.*

*58. The combination as defined in claim 57 further comprising means for moving said drill point along said axis of rotation such that said drill point forms a hole in said imperforate surface of said solid portion of said workpiece while said thread cutting means enters said hole without interference with said wall of said hole;*

*means for rotating said tool; and*

*means for concurrently moving said tool axially along said axis of rotation and orbitally around said axis of rotation such that as said tool moves axially and orbitally helical threads are formed in said wall of said hole in said workpiece.*

* * * * *